Nov. 18, 1958  M. C. KAHN ET AL  2,861,132
INSECT CONTROL APPARATUS
Original Filed Feb. 21, 1950  3 Sheets-Sheet 1

INVENTORS,
Morton C. Kahn
William H. Offenhauser, Jr.

by

ATTORNEY

Nov. 18, 1958   M. C. KAHN ET AL   2,861,132
INSECT CONTROL APPARATUS
Original Filed Feb. 21, 1950   3 Sheets-Sheet 2

INVENTORS,
Morton C. Kahn
William H. Offenhauser, jr
by
ATTORNEY

United States Patent Office 2,861,132
Patented Nov. 18, 1958

2,861,132

INSECT CONTROL APPARATUS

Morton C. Kahn, New York, N. Y., and William H. Offenhauser, Jr., Fairfield County, Conn., assignors, by mesne assignments, to The Marcelle and Edwin M. Fleischmann Foundation, Inc., Baltimore, Md., a corporation of Maryland Original application February 21, 1950, Serial No. 145,496. Divided and this application July 25, 1952, Serial No. 300,845

1 Claim. (Cl. 179—100.1)

The present invention relates generally to insect control and more especially to apparatus and methods for interrupting the life cycle of insects, such as mosquitoes, and other arthropods which are carriers of disease or involved in the destruction or damage of agricultural crops.

Means hitherto employed for destroying insect pests have been largely non-selective with the result that beneficial insects such as honey bees have been destroyed along with harmful insect pests such as mosquitoes, flies, gnats, locusts, etc. It is contemplated by the present invention to provide a novel means for causing individuals of a particular insect pest to alter their flight direction so that they may be destroyed.

Accordingly, one object of the present invention is to provide novel and effective means and methods for luring a preselected species of insects into a restricted area where they are destroyed by lethal devices.

Still another object of the invention is to provide novel, simple and effective apparatus for attracting individuals of a preselected species, genus or class of arthropods by means of sound waves attractive to the same, e. g., attracting members of one such species by means of sound waves characteristic of females of such species, and destroying such individuals.

A still further and more specific object of the invention is to provide a novel, simple and effective method for interrupting the life cycle of an undesirable species of insects by producing a functional response upon an external or internal organ of the individuals of such species to direct such individuals into the sphere of influence of destructive means.

Still another object of the present invention is to provide a novel, simple and effective means for interrupting the life cycle of insects of a predetermined species comprising means for producing sound wave patterns characteristic of the female individuals of such species thereby attracting individuals of such species toward the sound wave producing means and means for killing such attracted individuals at or adjacent such sound wave producing means.

A more particular object of the present invention is to provide a novel, simple and effective method for interrupting the life cycle of insects of a predetermined species which comprises recording sounds characteristic of the female individuals of such species, reproducing such recorded sound at a predetermined intensity for the purpose of attracting the individuals of such species toward the source of the reproduced sound and there destroying such attracted individuals.

A still further object of the present invention resides in means for recording sounds characteristic of female arthropods, such as the female members of a preselected species of insect.

A still further object of the invention comprises means for reproducing the sound of arthropods such as female anopheles or aedes mosquitoes and for employing the same as an insect-audible sound signal lure.

A still further object of the invention is to provide novel and effective methods and means for isolating sounds characteristic of individual insects of a preselected species and for recording predetermined portions thereof.

The foregoing and other objects and advantages of the invention will appear more fully hereinafter from a consideration of the detailed description which follows, taken together with the accompanying drawings wherein preferred apparatus embodiments of the invention are illustrated by way of example. It is to be expressly understood, however, that the drawings are for purpose of illustration and description only and are not to be construed as a limitation upon the invention.

The sounds produced by insects range in frequencies from the lower audio frequencies to supersonic frequencies, but, generally speaking, many insects emit sounds composed substantially of fundamental frequencies within the audio range.

In the following discussion particular reference will be made to mosquitoes as these insects are of special concern to us because of their ability to transmit many tropical diseases such as malaria, dengue fever, yellow fever, filariasis, and many others. However, the methods and apparatus described herein for destroying mosquitoes may be correspondingly modified in order to destroy effectively such pests as flies, gnats, beetles, crickets, katydids, locusts, cicadas, tsetse flies and other anthropods of disease and agricultural importance.

It has been found that each species of arthropod of a particular genus emits a distinctive and identifiable sound, i. e., the different species within a particular arthropod genus emit sounds which are peculiar to that particular species. This is not only believed to be true of many species of mosquitoes but also to be true of many other insect forms. Mosquitoes of different species may, for example, readily be identified by a trained ear from the sound produced by them. The sound emitted by mosquitoes consists of a particular fundamental frequency rich in harmonics and usually modulated at a very low frequency. The fundamental frequency of the sound of the different species of mosquitoes lies in the lower part of the audio range between approximately 250 and 750 cycles per second. In some spectrograms taken of mosquito sounds as many as 15 distinctive frequency bands are recognizable, some much more pronounced than others. The fundamental frequency is often not the dominant frequency. All mosquito sounds have vibrato effects. Some species emit tones with a single warble rate and other show a double warble modulation. The sound of the male individuals of a particular species of mosquitoes is distinct from the sound of female individuals, the dominant frequency thereof being somewhat higher although with very small difference in the fundamental frequency. Male sounds are usually more broken than the female sounds.

Because of the high harmonic content of mosquito sounds and the peculiar modulation thereof, it is difficult to analyze the sound and duplicate it artifically. Experiments indicate, however, that the individuals of a particular species of mosquitoes are attracted by sounds containing only the dominant frequencies of the sound of the female of the same species.

For highly satisfactory and effective results in luring mosquitoes toward a mosquito trap the actual sound of a female mosquito is used. Due to the difficulty in using the amplified sound of a female mosquito as a lure it has been found best permanently to record the sound of a female mosquito which recordings may then be duplicated and reproduced at will. A method and apparatus for recording and reproducing insect sounds will be described hereinafter in order that the invention may be more fully understood.

In the accompanying drawings wherein like reference characters refer to like parts:

Figure 1:
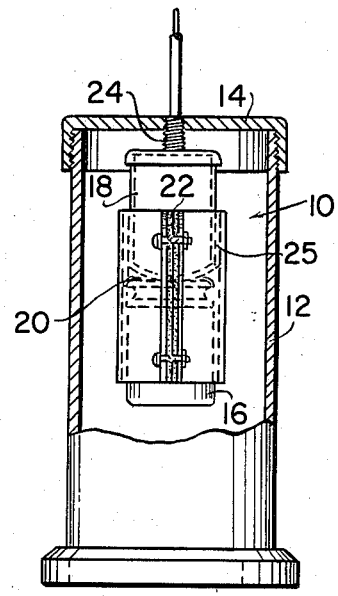
Fig. 1 is a view partly in section and partly in elevation of a microphone and sound chamber assembly.
Figure 3:
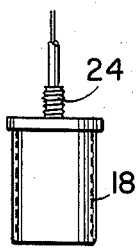
Fig. 3 is an elevational view of the microphone of Fig. 1.
Figure 4:
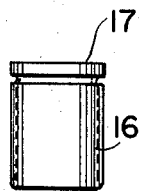
Fig. 4 is an elevational view of the sound chamber of Fig. 1.
Figure 5:
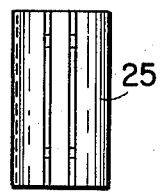
Fig. 5 shows retaining clamp for the microphone of Fig. 3 and sound chamber of Fig. 4.
Figure 6:
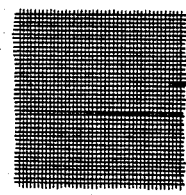
Fig. 6 shows an insect screen for closing the opening of the sound chamber of Fig. 4.
Figure 7:
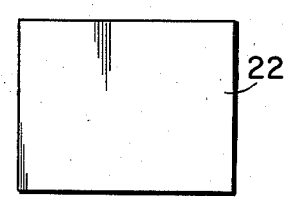
Fig. 7 shows an extended plan view of the acoustical seal of Fig. 1.

Referring now to Fig. 1 of the drawing there is shown a microphone and sound chamber assembly generally indicated at 10 mounted in a container 12 sealed by means of a cap 14 threaded thereon for acoustically shielding the assembly from the surrounding atmosphere. The individual arthropod, such as an insect, whose sound is to be recorded is placed in chamber 16 of assembly 10 and a microphone or transducer 18 is placed closely adjacent to the opening 17 of the chamber for optimum sound transfer efficiency. In order to confine the arthropod in the recording chamber a fine mesh net 20 is placed over the opening thereof between the chamber and the microphone and secured to the chamber in some convenient manner such as by a rubber band, for example. The sound chamber 16 is shown in Fig. 4 as comprising a glass jar whose size will depend on the size of the arthropod to be confined therein and which should be made as small as possible, due regard being taken, of course, of the physical freedom required by the arthropod. The mesh of the net 20 shown in Fig. 6 for covering the chamber should be sufficiently small to prevent the escape of the arthropod. The microphone 18 employed to pick up the sound from the arthropod emitted within the sound chamber and to produce an electrical signal amplitude modulated proportionally to the sensed sound. This microphone or transducer may be of any suitable type, for instance, it may be of the pressure type indicated in Fig. 3. The microphone is provided with a threaded hollow stem 24 for engagement with a threaded central bore in cap 14 for conveniently mounting the microphone and chamber assembly on the cap for suspending it within container 12. Acoustical shield 22 which may be made of a material such as rubber and shown laid out flat in Fig. 7 may be wrapped around the abutting recording chamber of Fig. 4 and microphone of Fig. 3 as shown at 10 in Fig. 1 and held in place by the cylindrical clamping device 25 shown in Fig. 5 in order to prevent loss of sound energy from the chamber, and to shield the chamber and microphone from ambient noise.

Theoretically, the best geometrical form for a sound chamber is a sphere as this provides the smallest amount of external surface for the largest internal volume. The cylindrical chamber shown, however, has the most practical geometric form and was found to have satisfactory acoustical characteristics. The energy level of the sounds emitted by mosquitoes being very low, of the order of $10^{-13}$ watt in some species, it is necessary to provide the sound chamber with better than 60 decibels of insulation at 800 C. P. S. which, incidentally, was obtained with the sound chamber arrangement described herein. If additional acoustical insulation is found desirable, container 12 may be nested within a further enclosure. In the design of an enclosure the customary sequence of acoustical elements should be adhered to for maximum acoustical effectiveness. Thus, the outside of the enclosure should be highly sound reflecting, then a material which is highly sound absorbing, and so on until the desired acoustical insulation for the sound chamber is achieved. If high efficiency of sound signal conversion is obtained, it is apparent that the signal-to-noise ratio of the electrical signal supplied by the microphone can be improved effectively by further reduction of the ambient noise by improving the acoustical filter.

In selecting a microphone it is important that it has a good high frequency response and rather poor low frequency response, i. e., is more sensitive to high frequency than to low frequency audible sound signals, and that it has a geometrical shape making it suitable for close coupling with the sound chamber.

The amplifiers used for amplifying the signal picked up by the microphone may be any modified high fidelity commercial type having a suitable amplification—in the case of mosquitoes a total amplification of more than 160 db—and having the best signal-to-noise ratio obtainable. The final signal should have a signal-to-noise ratio of at least 40 db to assure suitable performance.

Figure 2:
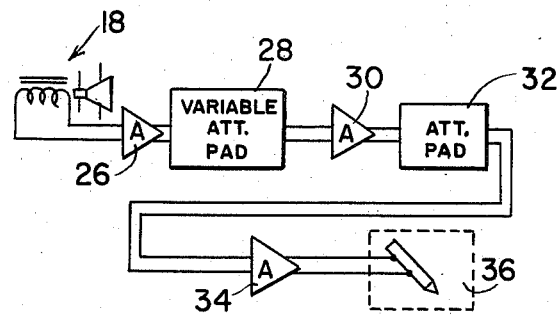
Fig. 2 is a schematic diagram of a circuit for recording the sound of an insect.

The amplifier and recorder system illustrated in Fig. 2 comprises generally the microphone pickup 18, a high amplification amplifier stage 26, a variable high attenuation pad 28, a second amplification stage 30, a fixed low attenuation 32, a third amplification stage 34 and a recorder 36. The variable attenuation pad 28 is used as gain control for the system. The low attenuation pad 32 was inserted to improve the frequency characteristics of the amplifier system. The frequency response curve of the amplifier should be characterized by rising slope with increasing frequency, i. e., the amplification factor increases as the frequency of the audible signal being amplified increases, because of the spectral energy distribution of mosquito sounds. The high energy components are located higher in the audio frequency spectrum and there are more transients than in the human voice, for example. A 6 db per octave rise in the amplifier response curve has been found to be satisfactory.

It has been found that effective recording results were obtained by using a high quality recording equipment inscribing on standard acetate discs but other satisfactory recording media may also be utilized such as magnetic tapes.

The recording of the sound of the mosquito or other arthropod should be begun after the insect or arthropod confined in the sound chamber has chirped or emitted its characteristic sounds several times within a few minutes which, in the case of *Anopheles albimanus*, usually occurs near sunrise and sunset. The recorded discs should be edited to eliminate duplication. Selected portions should then be re-recorded, repeating a selected sequence until the disc is filled. Thus, by using a standard record changer, for example, the recording may be repeated as long as it is desired. A substantial number of such recordings has been produced by applicants and is now available.

In order to lure male (or female) individuals of a preselected insect species into an insect trap such a recording is played continuously during the normal activity period of the particular insect species, and the transcribed sound is amplified and broadcast through a high quality audio speaker located behind the trap.

Figure 8:
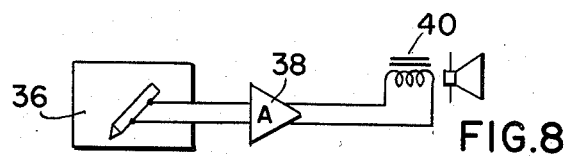
Figs. 8, 9 and 10 illustrate modified systems for reproducing insect sounds.
Figure 9:
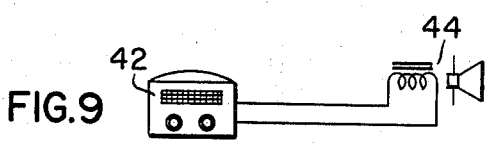
Figure 10:
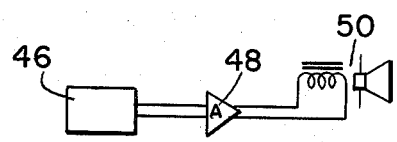

In Fig. 8 such a reproducing system is shown as comprising a pickup 36, an audio amplifier 38 and a loudspeaker 40. If it is desired to bait a plurality of insect traps with sound signals, the recording may be broadcast over a radio transmitting station and reproduced by a commercial receiver 42 having a speaker 44 as shown in Fig. 9. Fig. 10 indicates a system for transmitting an artificial insect or other arthropod signal developed in a signal generator 46, amplified by an amplifier 48 and transmitted by an audio speaker 50.

Various means and methods may be employed for trapping and for killing the insects attracted by the broadcast sound. It is deemed preferable to kill the insects by an electric screen, although other methods of killing them such as by radiation, by chemical means such as an insect killing spray or mist, for example, by mechanical means such as by crushing, adhesion or entrapment, or by firetraps may be found more convenient depending upon location. When it is desired to examine the attracted insects, they should be killed by a method which will not mutilate them.

Figure 11:
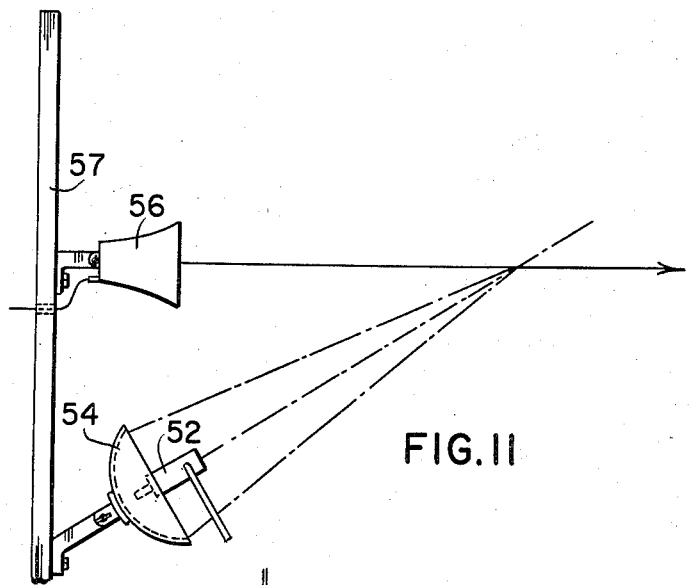
Figs. 11 and 12 illustrate two effective methods of killing the attracted insects.

An insect trap of the supersonic radiation type is illustrated in Fig. 11. A supersonic generator such as an air-actuated Hartman whistle is indicated at 52 located at the focal point of a collective reflector 54 mounted adjacent to a loudspeaker 56 on a support 57 and aimed so as to intercept the path of the insects migrating toward the loudspeaker. Supersonic radiation of the correct waveform, pitch and intensity is fatal to insects while being quite harmless to human beings and large animals. Other types of supersonic generators may, of course, be employed in the place of the Hartman whistle. Several sets of supersonic generator and reflector combinations may be employed to produce a field pattern completely encompassing the loudspeaker.

Figure 12:
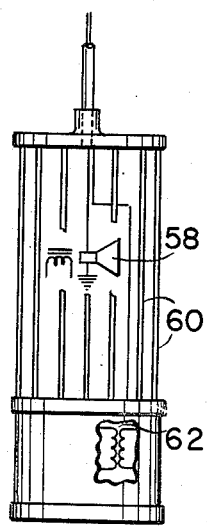

Another convenient insect trap is illustrated in Fig. 12 as comprising a loudspeaker 58 mounted within a wire screen having spaced wires 60 alternately maintained at a high potential with respect to each other. The mosquito or other insect or arthropod does not have to touch the wires to be killed. Passing between the wires without touching them is lethal and hence it is immaterial if the arthropod passes between the wires without touching any of them as is common when the wire spacing is of the order indicated. When an arthropod passes between two spaced wires, the voltage is first increased to the point where arc-over occurs due to the high voltage, following which the voltage then becomes somewhat decreased, say by about 5%, and thus the presence of the insect or other arthropod in the electric field between adjacent wires causes breakdown without any touching of the wires whatever. The spacing between adjacent oppositely charged wires should be of the order of ¼ of an inch in order to kill mosquitoes, and a voltage between adjacent wires of about 5,000 to 10,000 volts has been found satisfactory and may be supplied by a step-up transformer such as indicated at 62. The loudspeaker alone may be mounted within the charged wire cage and actuated from a remote point, or a complete reproducing system such as shown in Figs. 8, 9 and 10 may be enclosed therein.

Thus, in order to destroy arthropods of a particular species, for example, a particular species of mosquitoes such as the malaria-carrying *Anopheles albimanus*, a female individual of that particular species is selected and the sound thereof is recorded as set forth above and, for example, as illustrated in Figs. 1 and 2. The recorded sound is reproduced in a convenient manner such as by one of the apparatuses illustrated in Figs. 8, 9 or 10 and used in conjunction with a mosquito trap, such as illustrated in Figs. 11 or 12 and located in an infested area, at sunset and sunrise when this particular species of mosquito has been found to be especially active, and correspondingly for other arthropods. The invention may in general be employed and practiced at any time even though peak activity is absent since in this way the insect or arthropod population may be reduced to the infection threshold or below.

The catch of individuals of the species will vary for different species. Insects of either sex may be attracted by sound but for biological reasons the attraction of male individuals by female sounds has been found to be much more effective but calls other than sex calls, e. g., food calls, may be employed. The number of females caught in the trap will be far larger than the number which would have been destroyed in the absence of a sound lure by random flight alone, thus indicating that to some extent females as well as males of the species are attracted by the sound. It has been determined by actual tests that by using the method and apparatus as described above more mosquitoes were caught during one ten minute period than the total number of mosquitoes caught in a week in a conventional cattle trap in substantially the same location.

In addition to the use of this invention for large scale selective destruction of insect pests or other arthropods, it may also be employed for private use in destroying insect pests within a limited area in homes and gardens. For example, if a standard radio broadcast station were to transmit continuously mosquito inscriptions, ordinary home receivers turned down sufficiently so as not to disturb the sleep of human beings may be used to lure insects into conveniently located mosquito traps or areas or fields rendered lethal by chemical, mechanical or radiation means.

In this connection it should be added that there is a critical intensity of sound beyond which the insects or other arthropods may be repelled rather than attracted. For optimum effectiveness the maximum intensity of the sound lure should be somewhat below this critical intensity at the location of the insect trap. Optimum performance is indicated at a volume intensity of approximately 10 V. U. (volume units) as measured on an American Standard Electrical Volume Indicating Meter at the location of the trap, when fed into a Western Electric D-173491 loudspeaker or the equivalent.

Sound may also be used to repel insects or other arthropods. As above pointed out, when a certain intensity of the insect sound is exceeded, the insects will be repelled. Moreover, when a signal having a certain frequency is used, insects of some species will be repelled. Such frequency may be experimentally determined for the particular species or genus in question, and can be expected to be found to be higher than the tenth harmonic of the fundamental frequency of the sound of such insects as was determined to be the case for Coleoptera (Japanese beetles).

Although only one embodiment of the invention has been illustrated and described in detail, it is to be expressly understood that the invention is not limited thereto. Various changes can be made in the design and arrangement of the parts without departing from the spirit and scope of the invention which is defined by the appended claim.

This is a division of application S. N. 145,496, filed February 21, 1950, for "Improvement in Insect Control Apparatus and Methods."

We claim:

In a system for arthropod insect control utilizing a recorded insect-audible sound signal as the sole insect lure, the improved means for producing said recorded sound signal which comprises a small-volume sound chamber, acoustic insulation substantially surrounding said chamber for minimizing entry thereinto of external ambient sounds, a sound transducer in said chamber for producing an electrical signal, amplitude-modulated proportionally to sound signals originating in said chamber and sensed by the transducer, said transducer being characterized by a higher sensitivity to high frequency than to low frequency audible sound signals, electrical signal amplifying and modifying means electrically connected to said sound transducer having an audio amplifier with an overall response characteristic which rises with increasing audible signal frequency, and recording means electrically connected to said signal amplifying and modifying means for producing a substantially undistorted reproducible record of the output signal of said signal amplifying means.

(References on following page)

References Cited in the file of this patent

UNITED STATES PATENTS

| | | |
|---|---|---|
| 1,960,084 | Folmer et al. | May 22, 1904 |
| 1,645,295 | Rogers | Oct. 11, 1927 |

FOREIGN PATENTS

| | | |
|---|---|---|
| 3,018 | Great Britain | June 24, 1945 |

OTHER REFERENCES

"The Songs of Insects," G. W. Pierce, chapter IV (1948).

"The First Field Tests of Recorded Mosquito Sounds Used for Mosquito Destruction," by Morton C. Kahn and William Offenhauser, Jr., American Journal of Tropical Medicine, vol. 29, 1949, p. 811.

"Elements of Sound Recording," by Frayne and Wolfe, pp. 255–257, 395 and 396 (1949).